(12) United States Patent
Filippi et al.

(10) Patent No.: US 8,307,696 B2
(45) Date of Patent: Nov. 13, 2012

(54) ISOTHERMAL REACTOR

(75) Inventors: Ermanno Filippi, Castagnola (CH);
Enrico Rizzi, Casnate Con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 273 days.

(21) Appl. No.: 12/300,446

(22) PCT Filed: Apr. 27, 2007

(86) PCT No.: PCT/EP2007/003757
§ 371 (c)(1),
(2), (4) Date: Dec. 16, 2008

(87) PCT Pub. No.: WO2007/131610
PCT Pub. Date: Nov. 22, 2007

(65) Prior Publication Data
US 2009/0145589 A1 Jun. 11, 2009

(30) Foreign Application Priority Data
May 12, 2006 (EP) .................................. 06009888

(51) Int. Cl.
*G01M 3/04* (2006.01)
*B01J 8/02* (2006.01)

(52) U.S. Cl. ......... 73/40.5 R; 73/40; 422/119; 422/198; 422/200; 422/211; 165/157

(58) Field of Classification Search .................. 422/198, 422/199, 200, 190, 211, 119; 165/163, 168, 165/158, 157; 376/245, 250; 73/40, 40.5 R
See application file for complete search history.

(56) References Cited

U.S. PATENT DOCUMENTS

| | | | | |
|---|---|---|---|---|
| 2,893,701 | A * | 7/1959 | Bell | 165/134.1 |
| 2,948,516 | A * | 8/1960 | Martinelli et al. | 165/11.1 |
| 3,425,264 | A * | 2/1969 | Frei | 73/40.5 R |
| 3,522,008 | A * | 7/1970 | Defabaugh et al. | 436/3 |
| 3,721,116 | A * | 3/1973 | Brachet et al. | 73/40 |
| 4,199,975 | A * | 4/1980 | Schrock et al. | 73/40.7 |
| 4,568,277 | A * | 2/1986 | MacInnes et al. | 432/120 |
| 5,535,253 | A * | 7/1996 | Loisy et al. | 376/250 |
| 5,847,266 | A | 12/1998 | Nevruz | |

(Continued)

FOREIGN PATENT DOCUMENTS
DE 848035 C 9/1952
(Continued)

*Primary Examiner* — Jennifer A Leung
*Assistant Examiner* — Huy-Tram Nguyen
(74) *Attorney, Agent, or Firm* — Akerman Senterfitt

(57) ABSTRACT

The present invention concerns an isothermal reactor (1) comprising a pressure vessel (2) closed at the opposite ends by respective bottoms (3, 4), a reaction zone (9) in said pressure vessel (2) in which at least one catalytic basket (10) is positioned, and at least one heat exchange unit (13) embedded in said at least one catalytic basket (10), each heat exchange unit (13) comprising a plurality of heat exchangers (14) each having an inner chamber intended to be crossed by an operating heat exchange fluid, the reactor being characterized in that it comprises means (17, 18) for picking up samples of operating heat exchange fluid from groups (16) of pre-established exchangers in each heat exchange unit (13), so as to ascertain the possible existence of damaged exchangers (14) in said groups (16) of exchangers through analysis of respective samples of operating heat exchange fluid. The invention also concerns a method for detecting the existence of damaged heat exchangers in an isothermal reactor of the aforementioned type.

7 Claims, 2 Drawing Sheets

U.S. PATENT DOCUMENTS

| | | | |
|---|---|---|---|
| 5,976,461 A | 11/1999 | Kostuck | |
| 6,923,043 B2 * | 8/2005 | Rabelle | 73/40.5 R |
| 2003/0175184 A1 * | 9/2003 | Filippi et al. | 422/198 |
| 2009/0094999 A1 * | 4/2009 | Leatherbarrow | 62/132 |

FOREIGN PATENT DOCUMENTS

| | | |
|---|---|---|
| EP | 1514594 A1 | 3/2005 |
| EP | 1600208 A1 | 11/2005 |
| GB | 2280020 A * | 1/1995 |

\* cited by examiner

ISOTHERMAL REACTOR

FIELD OF APPLICATION

In its most general aspect, the present invention concerns a chemical reactor of the type comprising a substantially cylindrical shell (or pressure vessel), closed at the opposite ends by respective bottoms, a reaction zone in said pressure vessel in which at least one catalytic bed (or basket) is positioned, and a heat exchange unit embedded in said catalytic bed.

In particular, the present invention concerns a reactor of the type considered above, internally structured to allow the reactant gases and the gaseous reaction products to cross the bed of catalyst in the radial, axial-radial or axial direction (with reference to the axis of the pressure vessel of said reactor) and comprising a heat exchange unit consisting of a plurality of substantially boxed plate-shaped heat exchangers, defining a chamber inside them intended to be crossed by an operating heat exchange fluid.

More specifically, the present invention concerns a reactor of the aforementioned type in which it is foreseen to detect the existence of mechanically damaged heat exchangers and a method for detecting the existence of such damaged heat exchangers.

PRIOR ART

Reactors of the type indicated above are widely known in the field. They are particularly useful for carrying out exothermal and endothermal chemical reactions conducted in substantially isothermal conditions, in other words conditions in which the reaction temperature is controlled within a rather narrow range of values around a predetermined value.

In such reactors, the kinetics of a predetermined chemical reaction, either exothermal or endothermal, is promoted by the fact that the operating fluid, crossing the respective heat exchange unit, removes or gives off heat to the reaction environment (catalytic bed) so as to move the reaction towards its completion.

In the remainder of the description and in the subsequent claims, a reactor of the aforementioned type is identified with the term: pseudo-isothermal or in short isothermal reactor.

It is equally known that, during the operation of these isothermal reactors, the heat exchangers of the heat exchange unit, commonly referred to as plates, can undergo mechanical damages such as to lead to the possibility that the process gases (in other words the reactant gases and the gaseous reaction products) might come into contact with the heat exchange fluid flowing in the exchangers. Such mechanical damages are mainly the consequence of phenomena of corrosion and/or thermal shocks, or of manufacturing defects.

More specifically, the aforementioned mechanical damages can consist of the formation of small cracks in the plates, often at welding points, through which the process gases can penetrate into the chambers of the damaged plates, mixing with the operating heat exchange fluid whenever it operates at a lower pressure than the operating process pressure, or else through which the operating heat exchange fluid can leak from the damaged plates in the case it operates at a pressure higher than or substantially equal to the operating pressure.

This can occur, for example, in an isothermal reactor for the production of methanol in which the heat exchange plates are crossed by a coolant (e.g. boiling water) operating at a lower pressure than the operating process pressure. Indeed, in this case, process gases, i.e. $CO$, $H_2$ and methanol, may pass into the cracks of the damaged plates with them being absorbed in the cooling water.

It goes without saying that the aforementioned drawback negatively affects at least the productivity and the operating safety of the reactor to an extent increasing as the extent of the damage to the heat exchange plates increases.

It should also be noted that in the case there were an indication that could be associated with the existence of damage to the plates (for example reduction in performance of the reactor, overheating of the reactor and/or variation in pressure of the heat exchange fluid), identifying the damaged plates(s) to replace or repair it/them would require shut-down and maintenance time that would last too long if one considers that the number of plates in such a reactor is very large (in the order of hundreds) and that the damage could be small in size and thus difficult to spot. Moreover, should the reactor be shut down for maintenance operations, it would be necessary to place all of the plates with the heat exchange fluid under pressure in order to identify the damaged plate(s) through a corresponding loss of said fluid.

There is therefore a need in this field to have an isothermal reactor in which it is possible to detect the possible presence of damaged heat exchange plates in a simple and cost-effective manner in order to substantially reduce the shut-down and maintenance times of the reactor in the case in which it is necessary to replace or repair damaged plates.

SUMMARY OF THE INVENTION

The technical problem at the basis of the present invention is therefore that of providing an isothermal reactor that satisfies the aforementioned requirement.

Such a problem is solved, with the present invention, by an isothermal reactor comprising a pressure vessel closed at the opposite ends by respective bottoms, a reaction zone in said pressure vessel in which at least one catalytic basket is positioned, and at least one heat exchange unit embedded in said at least one catalytic basket, each heat exchange unit comprising a plurality of heat exchangers each having an inner chamber intended to be crossed by an operating heat exchange fluid, the reactor being characterised in that it comprises means for picking up samples of operating heat exchange fluid from groups of pre-established exchangers in each heat exchange unit, so as to ascertain the possible existence of damaged exchangers in said groups of exchangers through analysis of respective samples of operating heat exchange fluid.

Preferably, the aforementioned samples of operating heat exchange fluid are picked up through the aforementioned pick-up means at the outlet of the operating heat exchange fluid from the exchangers of the respective groups of exchangers.

Preferably, the aforementioned pick-up means comprise, for each group of exchangers, a collector duct of operating heat exchange fluid in fluid communication with each exchanger of the group of exchangers at the outlet of the operating heat exchange fluid from said exchangers, and a pick-up duct of operating heat exchange fluid in fluid communication with said collector duct and with the outside of the reactor.

Preferably, the pick-up ducts of the groups of exchangers are grouped into bundles at an end portion thereof and each bundle of ducts crosses a bottom or pressure vessel of the reactor so as to place the respective pick-up ducts in fluid communication with the outside of the reactor.

Preferably, the exchangers of each heat exchange unit each have a flat, plate-shaped structure with essentially elongated rectangular configuration with long sides parallel to the axis of the pressure vessel and short sides extending radially with respect to it.

The present invention also concerns a method for detecting the existence of damaged heat exchangers in at least one group of heat exchangers of an isothermal reactor of the aforementioned type. Such a method comprises the steps of:

picking up at least one sample of operating heat exchange fluid from at least one group of heat exchangers of said at least one heat exchange unit;

ascertaining whether there are damaged exchangers in said at least one group of heat exchangers through analysis of said sample or said samples of operating heat exchange fluid.

The present invention is based on limiting the search for damaged exchangers or plates within a certain group of plates (or certain groups of plates) of a heat exchange unit instead of over the entire heat exchange unit as required by the prior art.

This is achieved, according to a preferred embodiment of the invention, by picking up at least one sample of operating heat exchange fluid from each defined group of exchangers through the respective pick-up ducts and then analysing each sample so as to identify the group of plates (or groups of plates) containing the damaged plate(s).

The analysis carried out on the samples of operating heat exchange fluid coming from the groups of plates can be aimed at ascertaining whether process gas is present in said fluid which would reveal the existence of damaged plates inside the reactor. Since each sample of heat exchange fluid picked up from the reactor is associated with a certain group of plates (or with certain groups of plates) it is also possible to identify the group of plates (or groups of plates) containing the damaged plate(s).

The advantages that derive from this are clear and at the same time substantial. With the present invention it is indeed possible to carry out the aforementioned operations with the reactor operating and therefore to delay the shut-down of the reactor for the maintenance operations after having completed the analyses and therefore having identified the group or groups of plates containing the damaged plates. Moreover, the maintenance times are considerably reduced because, as the parts that need intervention are already known, it is possible to programme the work to be carried out in advance reducing to the minimum the time necessary for the operations of replacement of the groups of plates containing the damaged plates or of repair of the damaged plates in the groups identified.

It should also be noted that the analysis of the samples of heat exchange fluid coming from the respective groups of plates is absolutely simple and does not require complicated and expensive apparatuses.

For example, in the case of an isothermal reactor for the production of methanol, it is sufficient to detect the presence in the coolant of incondensable process gases, in this specific case the synthesis gases CO and H2, which is possible in a very simple way with the help of common analysis instruments.

Further characteristics and advantages of the present invention shall become clearer from the following description of an embodiment of the process according to the invention, given for indicating and not limiting purposes with reference to the attached drawings.

DETAILED DESCRIPTION OF A PREFERRED EMBODIMENT

Figure 1:
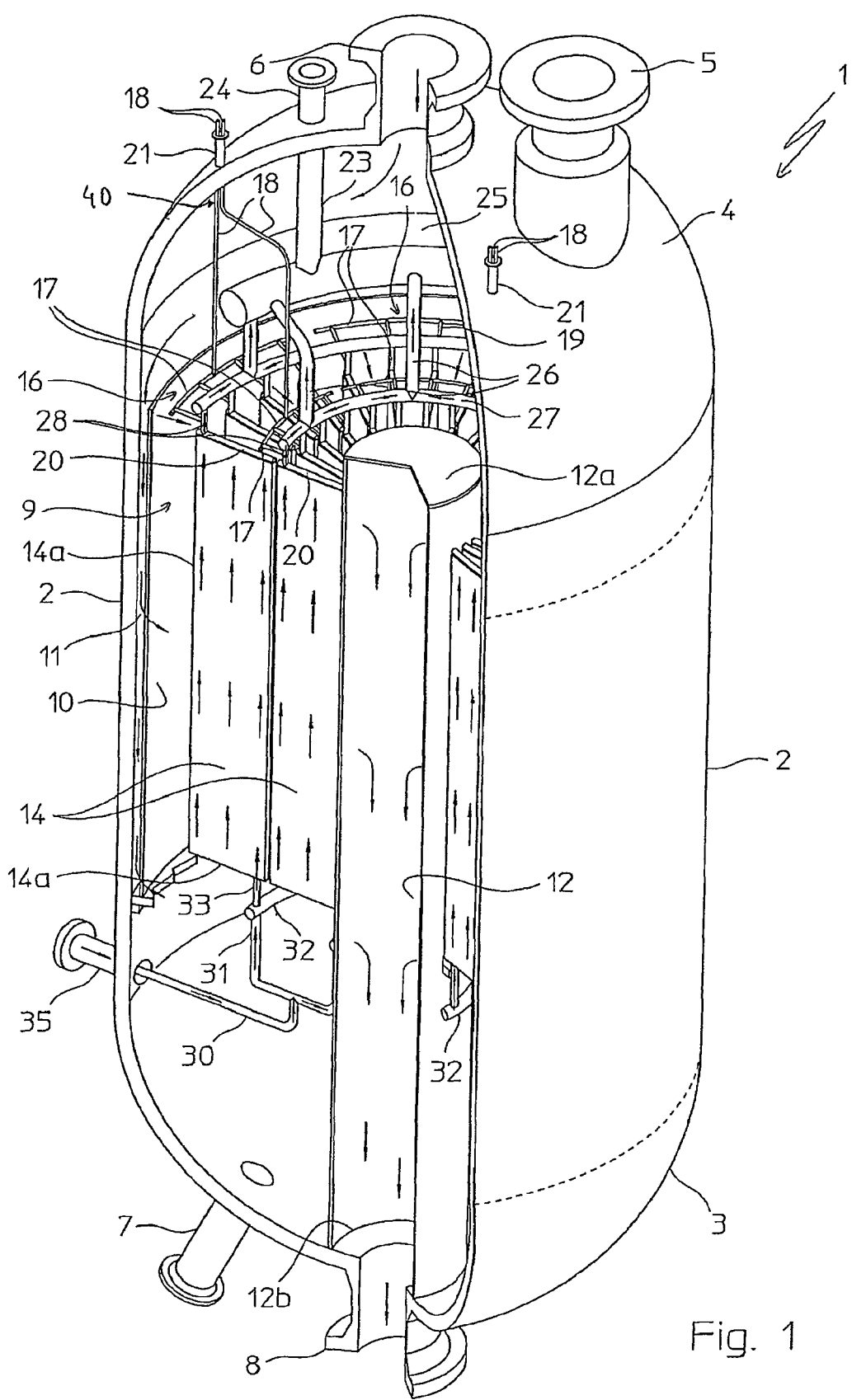
FIG. 1 shows a perspective partial section view of a radial isothermal reactor according to an embodiment of the invention, FIG. 2 schematically represents a perspective view of a group of heat exchangers (plates) of the heat exchange unit of the reactor of FIG. 1.

With reference to FIG. 1, reference numeral 1 globally indicates an isothermal reactor comprising a pressure vessel 2, with vertical axis, closed at the opposite ends by respective lower bottom 3 and upper bottom 4, conventionally equipped with passages 6, 8 for the entry and the discharge, respectively of the reactant gases and of the gaseous reaction products, into and from said isothermal reactor 1, as well as by a manhole 5 and a passage 7 for the release of catalyst.

In the pressure vessel 2 a reaction zone or environment is defined, in which at least one substantially cylindrical catalytic basket 10 is supported that is coaxial with the pressure vessel 2 and with it defining an interspace 11 of low width and a central duct 12, extending at the axis of the pressure vessel itself.

The catalytic basket 10 is perforated to allow the passage of the reactant gases from said interspace 11 to said reaction zone 9, whereas the central duct 12, also permeable to the gases, has a closed upper end 12a and an open lower end 12b in direct fluid communication with the passage 8 of the bottom 3.

The catalytic basket 10 is intended to contain a mass of an appropriate catalyst (not represented), in which a heat exchange unit globally indicated with 13 is embedded and supported, in a per se known way.

Said heat exchange unit 13 has an overall cylindrical configuration, having an outer diameter smaller than or substantially equal to the inner diameter of said catalytic basket 10 and an inner diameter greater than or substantially equal to the outer diameter of the axial duct 12.

Figure 2:
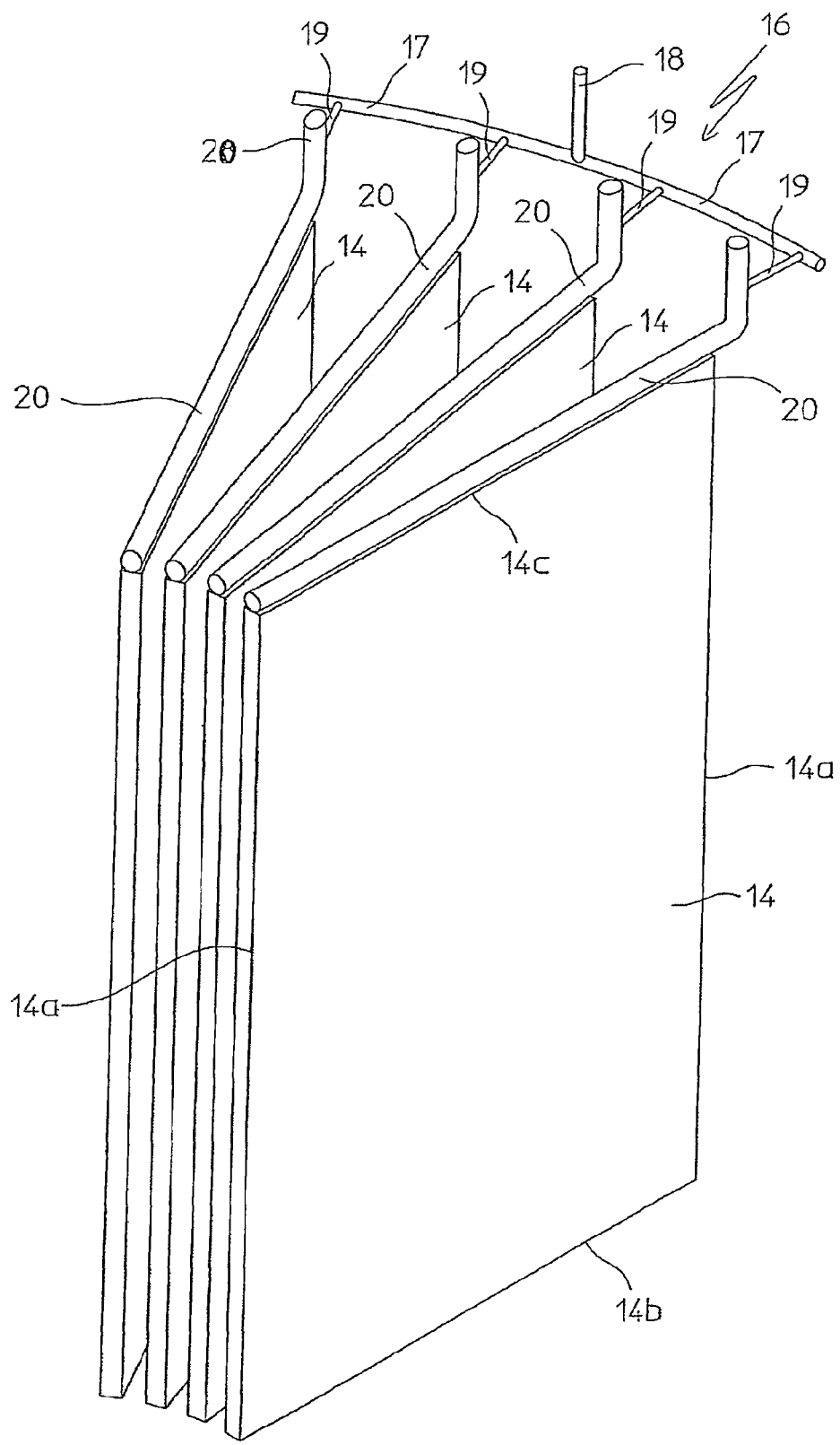

In particular, according to a preferred but not limiting embodiment schematised in FIG. 1, said heat exchange unit 13 comprises a plurality of heat exchangers 14 arranged radially regularly distributed in two coaxial and concentric rows. With reference to FIG. 2, each exchanger 14 has a flat, boxed substantially plate-shaped structure with essentially elongated rectangular configuration. According to the arrangement of FIG. 1, in the heat exchange unit 13, all of the exchangers 14 are arranged with the long sides 14a parallel to the axis of the pressure vessel 2 and the short sides 14b and 14c extending radially with respect to it.

More specifically, the exchangers 14 each consist of a pair of juxtaposed metal plates, joined together, in predetermined spaced apart relationship, through perimetric welding, so that a chamber is defined between them intended to be crossed by an operating heat exchange fluid.

In accordance with the present invention, in the heat exchange unit 13 of the reactor 1 there are, in each of the coaxial rows of exchangers 14, a plurality of groups 16 of exchangers, each group 16 being equipped with a respective collector duct 17, in fluid communication with each exchanger 14 of the corresponding group 16, and a respective pick-up duct 18 that projects from the collector duct 17 towards the outside of the reactor 1. More specifically, as better shown in FIG. 2, each group 16 of exchangers consists of a set of four exchangers 14 arranged radially with the respective collector duct 17 in fluid communication, through respective fittings 19, with collector ducts 20 of the heat exchange fluid going out from the chamber of the exchangers 14. Obviously, the number of exchangers 14 inside each group 16 can be varied as desired according to contingent and specific requirements and therefore the sets of four exchangers 14 shown in the figures should be considered a representative and not limiting example of groups of exchangers according to the invention.

Going back to FIG. 1, it should be noted that each collector duct 17 is situated at a height close to that of the upper short sides 14c of the exchangers 14 of the corresponding group 16 whereas each pick-up duct 18 extends above the respective collector duct 17 to be placed in fluid communication with the outside of the reactor 1. More specifically, according to a preferred embodiment of the invention, the pick-up ducts 18 of groups 16 of exchangers are grouped, at the respective end portions, in bundles 40 and each bundle 40 of ducts crosses the upper bottom 4 of the reactor 1 where the respective ducts are engaged through a mouth 21. In the non-limiting example shown in FIG. 1, each bundle 40 of ducts comprises two pick-up ducts 18 of the fluid respectively associated with a group 16 of exchangers 14 of the inner coaxial row and with a group 16 of exchangers 14 of the outer coaxial row.

In this way it is possible to substantially reduce the number of openings in the reactor 1 necessary to place the pick-up ducts 18 in fluid communication with the outside of the reactor 1 as well as the number of mouths 21 with the advantage of ensuring that the reactor 1 maintains adequate mechanical strength. Obviously, although less advantageous, it is possible to foresee that each pick-up duct 18 is placed in direct fluid communication with the outside of the reactor through a corresponding opening on a bottom 3 or 4, respectively lower or upper, or on the pressure vessel 2 of the reactor.

In the reactor 1, the mouths 21 can be connected to a conventional instrument for analysing the samples of heat exchange fluid picked up through the collector ducts 17 and the pick-up ducts 18.

The isothermal reactor 1 according to the invention also comprises a duct 30 for feeding the heat exchange fluid in fluid communication on top, through tubular fittings 31, with two annular feeding-distribution ducts 32, one for each coaxial row of exchangers 14, arranged under the heat exchange unit 13 in predetermined spaced relationship from it. The feeding duct 30 crosses the pressure vessel 2, where it is engaged, through a suitable mouth 35, to be connected, outside of the reactor 1, to an unrepresented source of said operating fluid (for example consisting of boiling water, or fused salts or similar).

The annular feeding-distribution ducts 32 are in turn in fluid communication on top, through tubular fittings 33, with the heat exchangers 14 of the respective coaxial row for the distribution of the heat exchange fluid inside of them.

Above the heat exchange unit 13, the reactor 1 comprises two concentric annular ducts 27, one for each coaxial row of heat exchangers 14, which receive the heat exchange fluid going out from the exchangers 14 from the aforementioned respective collector ducts 20.

The concentric annular ducts 27 are in fluid communication on top, through tubular fittings 26, with a general collector duct 25 of the heat exchange fluid going out from the heat exchangers 14 and then with a discharge duct 23 of said fluid to the outside of the reactor 1.

The discharge duct 23 crosses the upper bottom 4 of the reactor 1 where it is engaged, through a mouth 24, to be connected to different uses outside of the reactor 1.

The present invention brilliantly solves the technical problem considered above and achieves numerous advantages already highlighted previously including the main one consisting of the possibility of detecting the existence of damaged heat exchangers able to be associated with predetermined groups of heat exchangers in a simple and cost-effective way without having to shut down the reactor.

It should also be noted that although the present invention lends itself particularly to reactors operating with a pressure of the operating heat exchange fluid that is less than the operating pressure of the process gases, it is equally valid in the case in which the operating fluid has a pressure higher than or substantially equal to the operating pressure of the process gases. Indeed, in this case, should there be an indication that can be associated with the possibility of damage to the plates of the exchangers it is equally possible to detect the existence of damaged exchangers that can be associated with predetermined groups of heat exchangers, without shutting down the reactor, by reducing the production capacity of the reactor for a predetermined time period during which the operating heat exchange fluid is depressurised so as to have a lower pressure than the process pressure and taking samples of heat exchange fluid from the heat exchangers for analysis in the way described previously.

The invention thus conceived can undergo further modifications and variants, all of which are within the reach of the man skilled in the art and, as such, are covered by the scope of protection of the invention itself, as defined by the following claims.

The invention claimed is:

1. A method for detecting the existence of damaged heat exchangers in at least one group of heat exchangers of an isothermal reactor comprising:
   a pressure vessel closed at the opposite ends by respective bottoms,
   a reaction zone in said pressure vessel in which at least one catalytic basket is positioned,
   at least one heat exchange unit embedded in said at least one catalytic basket, each heat exchange unit comprising a plurality of heat exchangers each having an inner chamber intended to be crossed by an operating heat exchange fluid, the method comprising the steps of:
   operating said isothermal reactor by feeding reactant gases to said reaction zone for the production of a predetermined chemical compound and by feeding said heat exchange operating fluid to said plurality of heat exchangers in order to carry out a chemical reaction in said reaction zone in substantially isothermal conditions;
   picking up at least one sample of operating heat exchange fluid from at least one group of exchangers of said at least one heat exchange unit; and
   ascertaining whether there are damaged exchangers in said at least one group of exchangers through analysis of said samples of operating heat exchange fluid
   wherein the above steps of picking up and ascertaining are carried out during operation of the isothermal reactor.

2. The method according to claim 1, wherein said step of picking up at least one sample of operating heat exchange fluid is carried out through pick-up means comprising, for each group of exchangers, a collector duct of operating heat exchange fluid in fluid communication with each exchanger of the group of exchangers at the outlet of the operating heat exchange fluid from said exchangers, and a pick-up duct of heat exchange fluid in fluid communication with said collector duct and with the outside of the reactor.

3. The method according to claim 1, wherein said pick-up ducts of the groups of exchangers are grouped in bundles at an end portion thereof and each bundle of ducts crosses a bottom or the pressure vessel of the reactor so as to place the respective pick-up ducts in fluid communication with the outside of the reactor.

4. The method according to claim 1, wherein said heat exchangers each have a flat, plate-shaped structure with essentially elongated rectangular configuration with long sides parallel to the axis of the pressure vessel and short sides, lower and upper respectively, extending radially with respect to it.

5. The method according to claim 4, wherein each collector duct is situated at a height close to that of the upper short sides of the exchangers of a respective groups of exchangers and each pick-up duct extends at the top from the respective collector duct to be placed in direct or indirect fluid communication with the outside of the reactor.

6. The method according to claim 5, wherein the pick-up ducts of each bundle are engaged with said upper bottom of the reactor through a respective mouth.

7. The method according to claim 1, wherein the picking up of said at least one sample of operating heat exchange fluid is carried out at the outlet of said fluid from the exchangers of said at least one group of exchangers.

* * * * *